(12) United States Patent
Clawson et al.

(10) Patent No.: US 7,920,326 B2
(45) Date of Patent: Apr. 5, 2011

(54) INFLATABLE SCREEN WITH FULLY INTERNAL TENSION

(75) Inventors: Marcus J. Clawson, American Fork, UT (US); Stuart C. Farmer, Orem, UT (US); Kristen E. Bishop, Lindon, UT (US)

(73) Assignee: Open Air Cinema LLC, Orem, UT (US)

( * ) Notice: Subject to any disclaimer, the term of this patent is extended or adjusted under 35 U.S.C. 154(b) by 169 days.

(21) Appl. No.: 12/205,465

(22) Filed: Sep. 5, 2008

(65) Prior Publication Data

US 2010/0007949 A1 Jan. 14, 2010

Related U.S. Application Data

(60) Provisional application No. 61/079,800, filed on Jul. 10, 2008.

(51) Int. Cl.
*G03B 21/56* (2006.01)
(52) U.S. Cl. .................................. 359/443; 359/450
(58) Field of Classification Search .................. 359/443, 359/461, 450; 40/610
See application file for complete search history.

(56) References Cited

U.S. PATENT DOCUMENTS

| | | | | |
|---|---|---|---|---|
| 4,022,522 A | * | 5/1977 | Rain | 359/443 |
| 4,323,301 A | * | 4/1982 | Spector | 359/443 |
| 4,369,591 A | * | 1/1983 | Vicino | 40/610 |
| 4,802,734 A | * | 2/1989 | Walter | 359/443 |
| 6,008,938 A | * | 12/1999 | Suehle et al. | 359/443 |
| 6,668,475 B2 | * | 12/2003 | Carolan | 40/610 |
| 6,739,725 B2 | * | 5/2004 | Ben-Ari | 353/28 |
| 6,874,263 B2 | * | 4/2005 | Ohmuku | 40/590 |
| 7,181,877 B2 | * | 2/2007 | Quade | 40/610 |
| 7,397,603 B2 | * | 7/2008 | Peterson et al. | 359/443 |
| 7,446,937 B2 | * | 11/2008 | Poretskin | 359/443 |
| 7,490,426 B2 | * | 2/2009 | Scarberry | 40/610 |
| D593,591 S | * | 6/2009 | Hochendoner et al. | D16/241 |

OTHER PUBLICATIONS

U.S. Appl. No. 61/024,492, filed Jan. 29, 2008, Farmer et al.
U.S. Appl. No. 61/149,811, filed Feb. 4, 2009, Farmer et al.
U.S. Appl. No. 61/079,800, filed Jul. 10, 2008, Clawson et al.
U.S. Appl. No. 61/079,803, filed Jul. 10, 2008, Clawson et al.
U.S. Appl. No. 12/205,493, filed Sep. 5, 2008, Clawson et al.
U.S. Appl. No. 12/697,811, filed Feb. 1, 2010, Farmer et al.

* cited by examiner

*Primary Examiner* — Christopher Mahoney
(74) *Attorney, Agent, or Firm* — Workman Nydegger

(57) ABSTRACT

An inflatable moving screen system includes an inflatable support structure. The inflatable support structure has at least two horizontal tubes and at least two vertical tubes that collectively form a rectangular frame. A skirt is coupled to one of the horizontal tubes and to both vertical tubes. An air inlet is also provided in the support structure, so that as air is received, it can fill the support structure tubes. A projection surface is disposed within the rectangular frame and is permanently coupled directly to one of the horizontal tubes, to both vertical tubes, and to the skirt. An internal tension mechanism is also included. The skirt may be part of the internal tension mechanism, which is configured to create fully internal tension to stretch the projection screen automatically, by inflation of the four inflatable tubes, and without using external or removable tension mechanisms.

20 Claims, 3 Drawing Sheets

INFLATABLE SCREEN WITH FULLY INTERNAL TENSION

CROSS-REFERENCE TO RELATED APPLICATIONS

This application claims the benefit of, and priority to, U.S. Provisional Patent Application Ser. No. 61/079,800, filed on Jul. 10, 2008 and entitled "INFLATABLE SCREEN WITH FULLY INTERNAL TENSION," which is incorporated herein by this reference.

BACKGROUND OF THE INVENTION

1. The Field of the Invention

The present invention relates generally to systems and apparatus related to inflatable screens. More particularly, embodiments of the invention relate to inflatable movie screens in which the projection screen is maintained in tension with an internal tension mechanism.

2. The Relevant Technology

Inflatable movie screen technology is revitalizing the movie industry and allowing large numbers of people to view movies in almost any forum and venue. Almost any location—whether indoor or outdoor—now has cinema potential and can now be used for movie viewing. Moreover, the ability to create inflatable screens in any size can allow inflatable movie screen technology to be placed in a park, a stadium, or even on a rooftop for viewing by thousands of people, while the same technology may also be used in a backyard for viewing by only a handful of people.

Virtually all inflatable movie screen technology makes use of essentially four basic components, namely an inflatable support structure, an air blower for inflating the support structure, a removable viewing screen, and an attachment mechanism for connecting the removable viewing screen to the support structure. In providing an easy-to-use, cost-effective screen, each of these components has been considered necessary for providing a screen that caters to the market that includes outdoor movie viewers.

For example, as a movie screen is used outdoors, the projection screen and/or the support structure can get wet or dirty. Inasmuch as inflatable screens use blowers, and therefore make noise, the primary market for such inflatable movie screen technology has been outdoor use. As such, screens are therefore made removable to allow the user to remove the screen and wash it to remove dirt, or to store it separately to avoid the build-up of mildew. While it is also desirable to keep the support structure generally free of dirt and mildew, it will readily be appreciated that the effect of such is much less than the visual effect of dirt or mildew on the screen and the presentation thereon. Moreover, even in the indoor environment, it is generally desirable to keep the screen as wrinkle-free as possible, so the screen is also stored separately to keep it from being wrinkled with the support structure.

To allow users to easily remove the screen, devices have therefore been conceived and implemented. For example, in some cases, the screen has a number of eyelets spaced around its perimeter, while corresponding eyelets are found on the interior of the support structure. Passing a rope, cord, tether, bungee, etc. through each eyelet, the user may then temporarily attach the screen to the support structure. In some other cases, an eyelet, ring, or other structure may be formed or connected to the support structure or the screen, and straps connected to the other structure can pass through that structure. For example, a strap may have a hook-and-loop fastener or a buckle to attach to itself and thereby secure the screen in place. In still another example, a zipper may be partially attached to the screen, while a mating portion of the zipper is attached to the support structure. By connecting the two components of the zipper and zipping around the screen perimeter, the screen can be removably attached to the support structure.

Heretofore, the removable screens have also allowed the user to connect the screen and place it at the user's desired tension. For example, when a strap or bungee cord is used to attach the screen to the inflatable structure, the user can adjust the amount of tension of each strap. By adjusting the tension, the screen can be stretched and at least some of the wrinkles of the screen removed. Notably, however, with different straps or cords to provide tension, it is difficult to get the same tension at each point to provide uniform tension around the screen. In fact, if one cord is pulled too tightly, it may make it difficult or impossible to even attach one cord or strap at a desired location.

Accordingly, there is a continuing desire for new and improved apparatus and systems that allow users to view a movie in an outdoor or other environment. In particular, it is desired to provide uniform tension to an outdoor movie screen, and to reduce wrinkles on the screen.

BRIEF SUMMARY OF THE INVENTION

The principles of the present invention relate to systems and apparatus related to inflatable screens. More particularly, exemplary systems and apparatus relate to inflatable movie screens in which a projection screen is automatically placed in tension by an internal tension mechanism.

An inflatable screen is disclosed that includes a projection surface and an inflatable support. The projection surface is directly coupled to the inflatable support, and such that as air is supplied to the inflatable support, the inflatable support automatically provides fully internal tension to the projection surface.

An inflatable projection screen structure includes an inflatable support structure and a screen that is substantially permanently connected to the inflatable support structure. An internal tension mechanism is also coupled to the screen and is adapted such that it automatically stretches and supports the screen within the inflatable support structure when air is supplied to the inflatable support. Thus, inflation of the support structure, rather than tensioning bands, cords, zippers, etc. can be used for internal and automatic tension of the screen.

An inflatable movie screen system includes an inflatable support structure. The inflatable support structure includes, in one example, at least two horizontal tubes and at least two vertical tubes that collectively form a rectangular frame. An optional skirt may also be coupled to the support structure, such as by being coupled to one of the horizontal tubes and/or to one or both vertical tubes. The support structure need not, however, be rectangular, as it may be square, curved, dome-shaped, or have any other suitable shape.

Regardless of the shape of the support structure and/or inflatable movie screen, one or more air inlets may also be provided in the support structure, so that as air is received, it can fill the support structure tubes and act as an additional tube. In the example of a rectangular support structure, a projection surface may be disposed within the support structure and can be permanently coupled directly to one of the horizontal tubes, to both vertical tubes, and to the skirt. An internal tension mechanism is also included. The skirt, if included, may be part of the internal tension mechanism, which is configured to create fully internal tension to stretch the projection screen automatically, by inflation of the four inflatable tubes, and without using external or removable tension mechanisms.

These and other objects and features of the present invention will become more fully apparent from the following description and appended claims, or may be learned by the practice of the invention as set forth hereinafter.

BRIEF DESCRIPTION OF THE DRAWINGS

To further clarify aspects and features of embodiments of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

In order to describe the manner in which the above-recited and other features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

It is to be understood that the drawings are diagrammatic and schematic representations of such exemplary embodiments. While the figures illustrate embodiments of the invention according to one scale, it will be appreciated that they are not limiting of the present invention, and are not necessarily drawn to scale for all embodiments of the invention. In particular, unless specifically claimed, no particular size, shape or other configuration is required.

In the following description, numerous specific details are set forth in order to provide a thorough understanding of the present invention. It will be obvious, however, to one skilled in the art that the present invention may be practiced without these specific details. In other instances, well-known aspects of inflatable movie screens, sewing, and fabric treatment have not been described in particular detail in order to avoid unnecessarily obscuring the present invention.

General Inflatable Screen System

Figure 1:
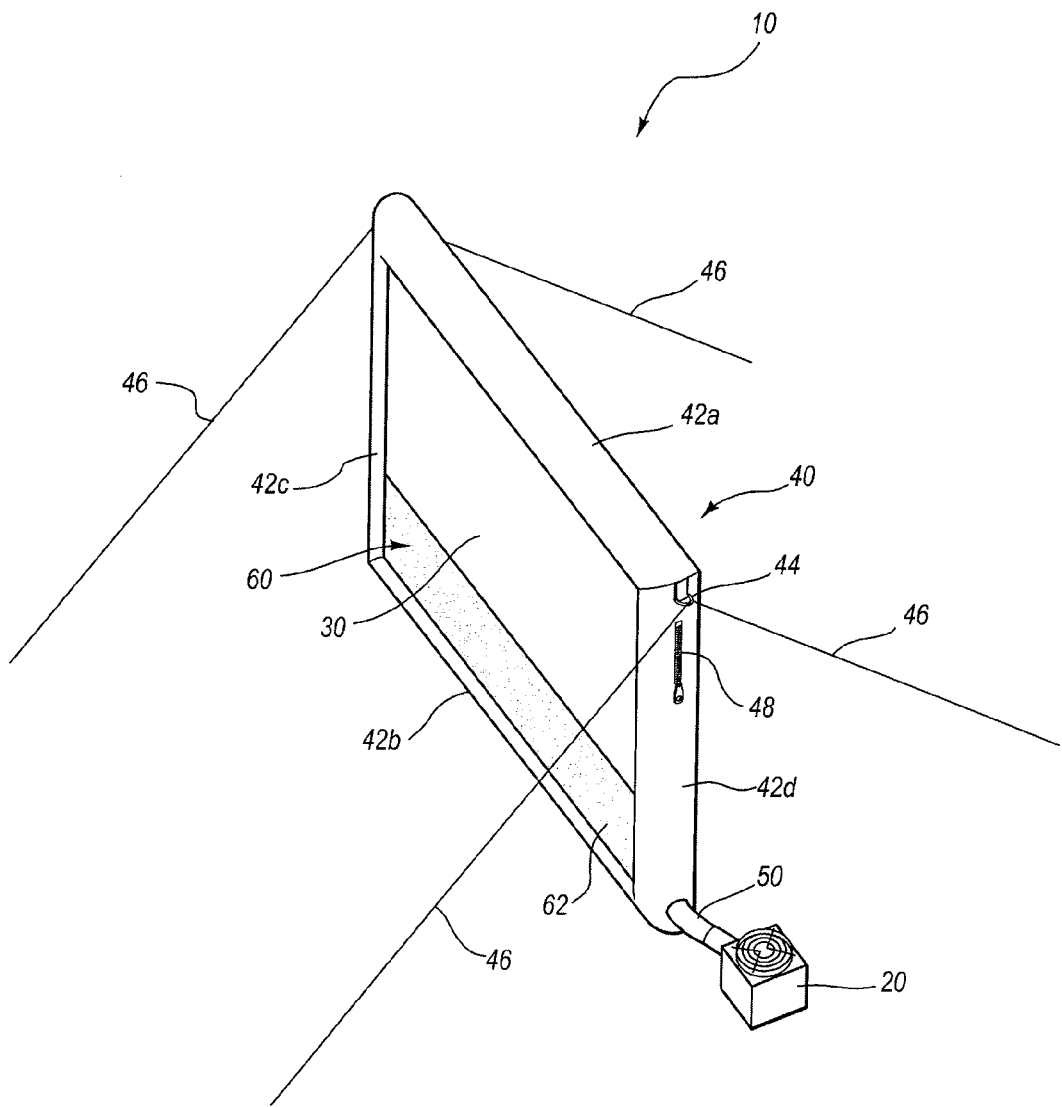
FIG. 1 illustrates a frontal perspective view of an example inflatable movie screen according to one aspect of the present invention.

By way of example, FIG. 1 illustrates an inflatable screen system 10 configured to have fully internal tension applied to a screen 30, according to one embodiment of the present invention. In particular, in the illustrated embodiment, inflatable screen system 10 includes a support structure 40 that is attached to a blower 20 and to screen 30. Screen 30 generally represents any type of screen, and may also include a projection or other viewing surface.

Figure 2:
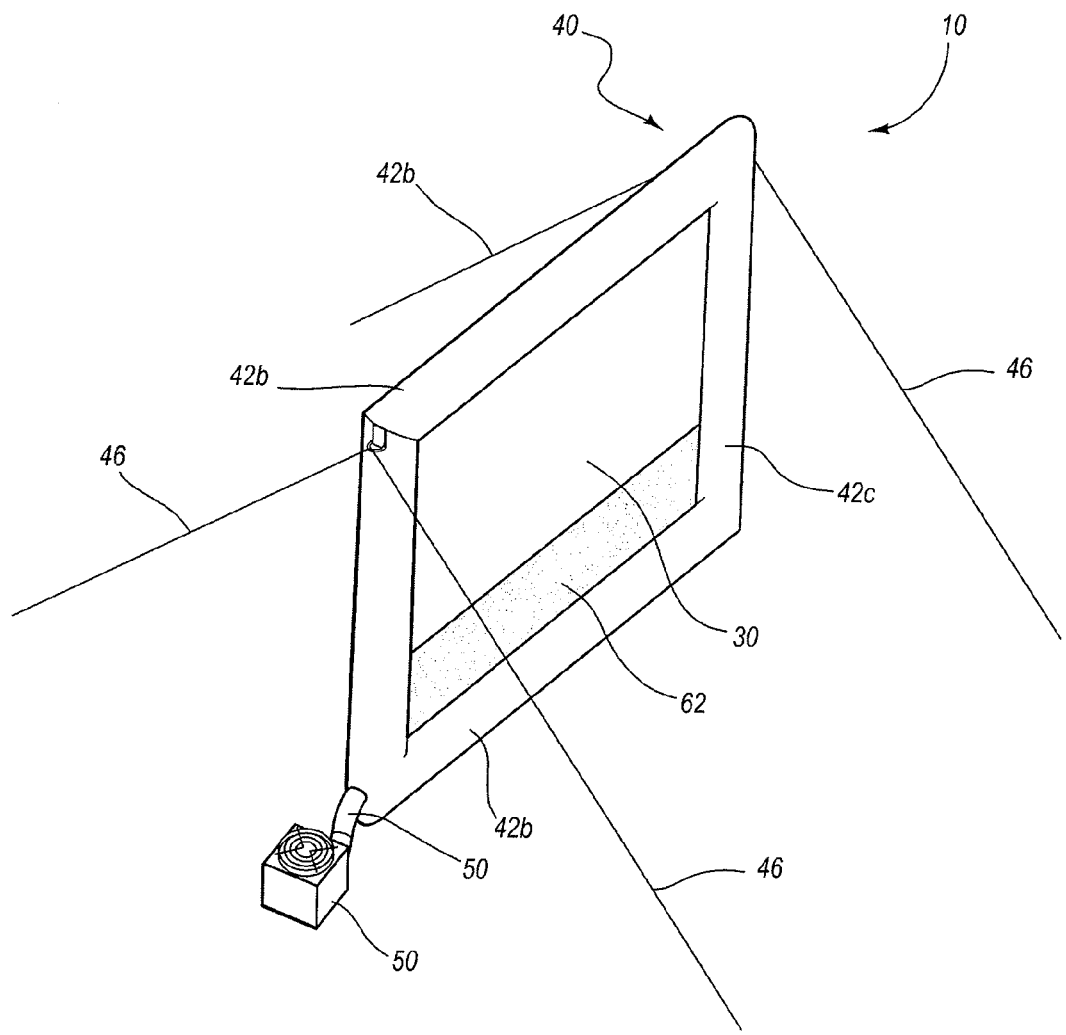
FIG. 2 illustrates a rear perspective view of the example inflatable movie screen of FIG. 1.

As further shown in FIGS. 1 and 2, support structure 40 is configured to receive air from blower 20 through an air inlet 50. Air inlet 50 is, in this embodiment a blower tube or inflation point and is coupled to support structure 40 as well as to an external and removable blower 20, although it will be appreciated that this is exemplary only. For example, in other embodiments, air inlet 50 and/or blower 20 may be integrally formed within support structure 40. Moreover, although a single air inlet 50 and blower 20 is illustrated, this is exemplary only and in other embodiments there may be two or even more air inlets and/or blowers.

With continued reference to FIGS. 1 and 2, it can further be seen that an example embodiment of a projection screen system 10 according to the present invention can include a substantially rectangular support structure 40. Although the illustrated configuration is exemplary only, support structure 40 includes, in this example, four interconnected tubes 42*a-d* which collectively form rectangular support structure 40. More particularly, in this example embodiment, support structure 40 includes two substantially horizontal tubes 42*a* and 42*b* as well as two substantially vertical tubes 42*c* and 42*d*.

Although the tubes of support structure 40 have been referenced relative to their approximate orientation, it will be appreciated that this is exemplary only. For example, it will be appreciated in view of the disclosure herein that as air is pushed into support structure 40, the air can cause support structure 40 to sway and/or twist, such that horizontal tubes 42*a* and 42*b* may oscillate and move around a horizontal position, while vertical tubes 42*c* and 42*d* can also sway and twist around a vertical position. Further, as system 10 is optionally configured for outdoor use, wind or other environmental factors may also cause it to sway such that its orientation is not always fixed. In still other embodiments, support structure 40 may have other configurations, such as trapezoidal, circular, square, etc., such that it is also not necessary that support structure 40 have a generally rectangular structure. For instance, support structure 40 may have a curved shape, such as a dome-type structure and/or can then include a generally flat or curved screen 30. Additionally, or alternatively, the support structure 40 can have additional supports, such as feet that may be positioned under a frame and provide height to the structure and/or facilitate maintaining inflatable screen system 10 in an upright position. These examples are, however, merely illustrative, and not limiting, as numerous other support structure configurations may be used.

In general, tubes 42*a-d* may be configured to have an open channel therein, such that as air enters inlet 50, air may flow around structure 40 and into and/or out of any of tubes 42*a-d*. In one example, for instance, tubes 42*a-d* may be formed of a fabric material and are sewn together such that support structure is substantially hollow to permit air flow therein.

Support structure 40 may thus include one or more inflatable tubes 42*a-d* or other inflatable portions. Support structure 40 is therefore, in this example, inflatable. Nevertheless, although support structure 40 is inflatable, it may also include other features or components which are not necessarily inflatable. For example, as shown in FIGS. 1 and 2, support structure 40 can also include one or more tethers 46 to facilitate maintaining screen system 10 in a standing position. Tethers 46 may also have other purposes or uses in addition to facilitating maintenance of system 10 in a standing position. For instance, tethers 46 may also be configured to allow audio speakers to hang therefrom. By way of example, such speakers can be hung directly on tethers 46 and/or tethers 46 may include support elements or clips which facilitate support of the speakers.

Tethers 46 can be attached to support structure 40 in any suitable manner. For example, in the illustrated embodiment, a ring 44 is sewn to, or otherwise attached to substantially vertical tube 42d, and a corresponding ring (not shown) is attached to substantially vertical tube 42c. Tethers 46, which may be tie-down ropes, cords, clips, ratcheting systems, and/or any other suitable structure, are then connected to ring 44 and extended at an angle towards the ground. Tethers 46 may there be attached to a stake which is placed in the ground, attached to a weight, or otherwise secured to the ground.

In the example embodiment, four tethers 46 are illustrated, and the use of two rings 44 is suggested. It will be appreciated that this is exemplary only, and that other configurations and numbers of tethers 46, rings 44 or additional support structures may be utilized. although this is exemplary only. For example, in another embodiment, four rings 44 are attached to support structure 40 (e.g., two near the top of screen 30 and two near the bottom of screen 30). Eight total tethers 46 may thus extend from rings 44 to help sustain inflatable screen system 10 in an upright position. In still other embodiments, rings 44 and/or tethers 46 may be placed at about a bottom of support structure 40, at a mid-point of screen 30, or at any other location on or near support structure 40.

Tethers 46 may further be secured to the ground or otherwise secured in place before, during and/or after inflation of screen system 10. As will be appreciated, tethers 46 may extend from support structure at any number of angles and still reach the ground and be able to support screen system 10 in an upright configuration. According to one embodiment, tethers 46 may be preconfigured such that when placed at specific measurements, prior to inflation, screen system 10 may inflate without any human assistance. Such measurements will, however, vary based on the size of screen system 10, such that no particular measurements are preferred. Nevertheless, it will be appreciated that for any number of sizes of system 10, such dimensions can be readily calculated or measured. At such measurements, tethers 46 can facilitate pulling of screen system 10 into a standing position as it inflates.

According to one aspect of the invention, screen system 10 is configured to continually receive air from blower 20 throughout all, or substantially all, of the use of screen system 10. When blower 20 is turned off, support structure 40 may then begin to automatically deflate. When deflated, support structure 40 and optionally screen 30, can be packaged together and put in a box, duffle bag, or other container so that it can be easily moved between locations.

To facilitate deflation, one or more openings may be formed in tubes 42a-d or in other locations of support structure 40. In the illustrated embodiment, a zipper-enclosed opening 48 is positioned near the upper corner of tube 42d. Such an opening 48 can operate as a vent to hold air when the zipper is closed (e.g., during use of screen system 10), and/or to release air when the zipper is opened (e.g., after use of screen system 10, when blower 20 is turned off). Additionally, or alternatively, one or more additional inflation tubes can be utilized. For instance, on the opposite side of screen system 10, a second inflation tube or air inlet may be provided. The second inflation tube could allow additional blowers to be connected to screen system 10 for efficient inflation thereof. Additionally, when screen system 10 is deflated, the additional inlet can then operate as a vent or air outtake to facilitate deflation.

As will be appreciated in view of the disclosure herein, while inflatable screen system 10 may be configured to operate with the continuous flow of air during use, it may alternatively be configured as a closed-air system. For example, support structure 40 and inlet 50 may be sealed to substantially reduce the amount of air flowing out of support structure 40. A user may then turn off blower 20 when support structure 40 is sufficiently inflated, or blower 20 may be configured with a sensor to automatically turn off at a particular pressure. Depending on the amount of air lost in the system 10, blower 20 may then remain off during use of inflatable screen system 10, or may need to be temporarily restarted to replace lost air.

The foregoing discussion of the illustrated embodiments is merely exemplary, and no feature is considered necessary unless specifically recited as such. Indeed, each element may be alternatively configured. For example, while the embodiments of FIGS. 1 and 2 illustrate a system 10 having only tubes 42a-d as being inflatable, this may also be exemplary or only a partial component of the inflatable support.

Figure 3:
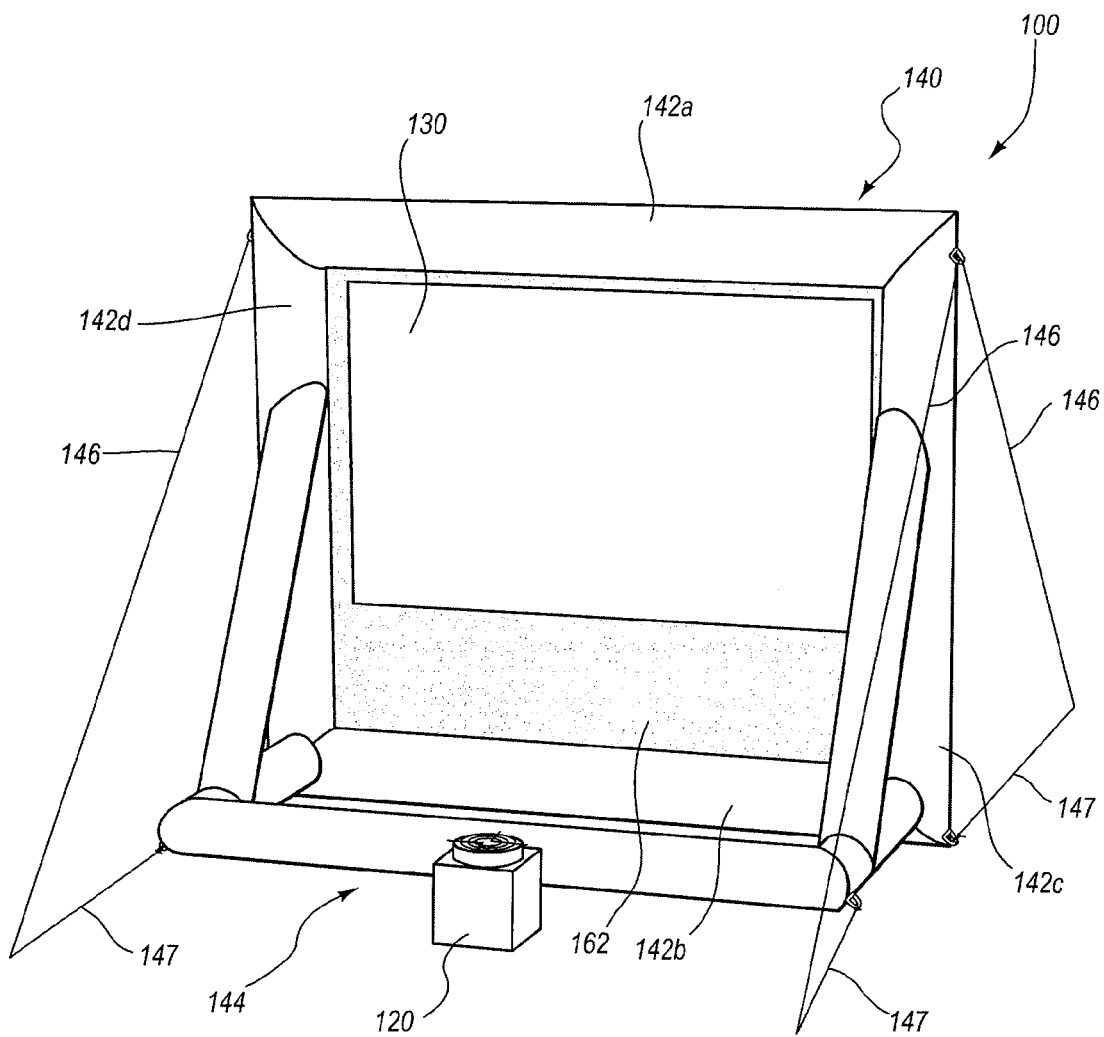
FIG. 3 illustrates an alternative example of an inflatable movie screen according to another aspect of the present invention.

For example, FIG. 3 illustrates an alternative embodiment in which an inflatable screen system 100 is illustrated as having a support structure 140, screen 130 and blower 120. In the illustrated embodiment support structure 140 includes tubes 142a-d forming a rectangular frame around screen 130. Additionally, however, support structure 140 also includes an inflatable upright support 144. Such an upright support 144 may, for example, allow inflatable system 100 to be maintained in an upright position without or with a reduced number of tethers, tie-downs, or similar devices. In other embodiments, however, such structures may optionally be included in addition to upright support 144.

In embodiments which include an upright support 144, any suitable support structure may be used. In the illustrated embodiment, for instance, an A-frame type upright support 144 is used. In other embodiments, however, upright support 144 may instead include supports, or feet, directly under bottom tube 142d, for example.

Additionally, as shown in FIGS. 1-3, any number of suitable tethers or other supporting elements can also be added to further facilitate maintenance of an inflatable device in an upright position. In FIG. 3, for example, a set of optional tethers 146 are illustrated that connect at or near a top portion of side tubes 142c, d. Such tethers can then angle down towards the ground, where they can be secured by a stake or other suitable device. Additional or alternative bottom tethers 147 may also be connected to upright support 144 and/or frame 140. For instance, in the illustrated example, D-rings or other suitable connectors are provided at the bottoms of side tubes 142c, d and at the back end of the bottom portion of upright support 144. The bottom tethers 147 may then be extended therefrom and can also be secured in any suitable manner. Instead of bottom tethers 147, stakes or other securement devices may also be connected directly to the D-rings so as to secure system 100 to the ground.

According to one embodiment, bottom tethers 147 may have a predetermined size configured to extend from support 144 and/or tubes 142c, d a predetermined distance. For instance, bottom tethers 147 may extend a distance that determines where tethers 146 should be staked. By way of example, when system 100 is deflated, bottom tethers 147 can thus be extended from frame 140 and staked to the ground. Before inflation, tethers 146 can also be extended and staked to the ends of bottom tethers 147. Then, when inflation begins, system 100 may already be fully staked. Thus, by pre-measuring bottom tethers 147, it can already be known where to position tethers 146. This can facilitate, for example, inflation of system 100 such that little or no human intervention is needed to support system 100 while inflation occurs.

As will be appreciated in view of the disclosure herein, the position of bottom tethers 147 and upper tethers 146 can vary depending on the structure, size and design of system 100.

Thus, while in one example it may be desirable that upper tethers 146 extend outward from frame 100 a distance that is at least as much as the height of the screen, this is merely exemplary. Additionally, while tethers 146, 147 can extend straight forward or backward from their attachment points on system 100, they may also extend outward at an angle. For instance, upper tethers 146 may extend outward and to the side (i.e., either inside or outside).

Internal Tensioning

According to some aspects of the present invention, inflatable screen system 10 includes an internal tensioning mechanism, so that tension can be applied to screen 30 automatically, and without requiring user intervention. As used herein, in both the description and the claim appended hereto, the term "internal tension" shall be used to refer to mechanisms of the inflatable screen system that cause the inflatable support structure to stretch and support a screen with the mere addition of air to the inflatable support structure. Accordingly, a "fully internal tension" on a screen shall refer to the ability of a screen to rely solely on the addition of air to provide a desired amount of tension to the inflatable support, and without the use of any external or removable tension mechanisms.

Returning to FIGS. 1 and 2, a description of an internal tension mechanism 60 suitable for use with some embodiments of the present invention is further described. Such a mechanism 60 may, for example, allow for the inflatable screen system 10 to be inflated and to automatically create tension in screen 10 to reduce and potentially eliminate wrinkles viewed on screen 10 and which can disrupt the display of media or another presentation thereon. In some cases, internal tension mechanism 60 may allow for tension to be applied to screen 30 and be self-correcting so that as pressure builds up in one location, thereby causing pressure to be applied to that location, the pressure is then automatically distributed elsewhere within support structure 40 to apply the pressure approximately equally throughout tubes 42*a-d* and ultimately to screen 30.

In particular, in the illustrated embodiment, internal tension mechanism 60 includes a skirt 62 and that is coupled to support structure 40. In the illustrated embodiment, for instance, skirt 62 is positioned near the bottom of support structure 40, and is, more particularly, connected to the bottom of screen 30 and to the outer surface of bottom tube 42*b*. The left and right sides of skirt 62 are then attached to left tube 42*c* and to right tube 42*d*, respectively, to thereby fill the area of inflatable screen system 10 that is immediately below screen 30.

While skirt 62 is, in the illustrated embodiment, shown has having a generally rectangular configuration, it will be appreciated that skirt 62 may be rectangular, square, or have other shapes. For instance, in one example, skirt 62 is curved, and may have a curved appearance when system 10 is inflated, or may have a rectangular configuration when system 10 is inflated. By way of example, skirt 62 may be made of a material, such as nylon, while screen 30 is made of a different material, such as spandex. As screen 30 stretches during and after inflation of system 10, screen 30 may pull unevenly on skirt 62. Skirt 62 may thus be curved or have some configuration which is not rectangular or which does not have straight to compensate for unequal stretching caused by the spandex. Such curved or otherwise uneven edges can thus equalize stretching of screen and optionally gives screen 30 and/or skirt 62 the appearance of having a straight edge.

Additionally, while screen 30 is illustrated as having a generally rectangular configuration, it will be appreciated that such a screen 30 may be rectangular, square, or have other shapes. For instance, similar to skirt 62, screen 30 may be curved to allow stretching to a rectangular shape. Further, screen 30 may be cut, prior to attachment to support structure 40, to have bowed corners. Such bowing in the corners may, for example, facilitate equal stretching to compensate for tension and thereby provide a rectangular screen 30 when system 10 is inflated.

While reference is made herein to a rectangle shape, it should be appreciated that a rectangle should not be given any specific proportions, and can include any sized rectangle, including a square with sides of equal lengths. Thus, while in one aspect screen 30 is rectangle and sized to generally correspond to a 16:9 or 4:3 aspect ratio, these are merely exemplary, and other aspect ratios and sizes are fully encompassed by the disclosure herein.

The remaining portions of screen 30 (i.e., the left, right, and top sides) can then be connected directly to tubes 42*a*, 43*c*, and 42*d*. In particular, in the embodiment illustrated in FIG. 1, the left side of screen 30 is connected directly to the upper portion of left tube 42*c*, the top side of screen 30 is connected directly to top tube 42*a*, and the right side of screen 30 is connected directly to the upper portion of right tube 42*d*.

Any suitable type of connection between screen 30, tubes 42*a*, 42*c* and 42*d*, and skirt 62 may be used. In one example, screen 30 is attached to each of tubes 42*a*, 42*c* and 42*d*, and skirt 62 directly by sewing screen 30 thereto. In this manner, screen 30 may therefore be substantially non-removable and substantially permanently secured thereto. In another aspect, screen 30 may be affixed using an adhesive, welded or another mechanism for substantially permanently securing screen 30 to support structure 40 and/or skirt 40. Skirt 40 may also be connected to tubes 42*b-d* in a similar manner.

As air enters support structure 40, pressure may initial build-up unevenly. For example, when the blower starts, the air pressure near inlet 50 may be greater than at an opposing corner. As the air continues, the air will start to flow throughout the entire support structure, and air pressure will tend to approximately equalize throughout the system 10. As that air pressure equalizes, the air will cause about an equal amount of pressure along the points within support structure 40 at which skirt 62 and screen 30 are connected to tubes 42*a-d*. In this manner, as air flows through inflatable screen system 10, tubes 42*a-d* will pull directly on the sides and top of screen 30, and on the sides and bottom of skirt 62. Skirt 62 will, in turn, pull on the bottom of screen 30. As screen 30 is sewn or otherwise connected to skirt 62 and support structure 40 at numerous locations (e.g., there may be thousands or tens of thousands of stitches), the about constant pressure around support structure can cause an approximately equal amount of pressure at all locations, to thereby pull screen 30 into an almost perfect rectangular shape.

Notably, the ability to thereby pull in all directions at once, with about equal pressure, is a clear distinction from prior systems which use a few, discrete locations to affix separate connection and/or tension mechanisms. Thus, as described previously, while one system may utilize multiple straps, the tension applied by one strap may differ from that at another strap, so that the screen has a tendency to deform from its rectangular shape. Furthermore, by virtue of specific measurements and sizes of tubes 42*a-d*, support structure 40 can inflate to tighten screen 30 evenly. As noted above, such inflation can optionally act in conjunction with other inflatable or non-inflatable structures (e.g., skirt 62) which may also be measured and sized for equal tensioning of screen 30. For instance, as also noted above, a skirt 62 may be constructed with a curved edge to compensate for unequal stretching and thus provide equal tensioning on screen 30.

Thus, embodiments of the present invention can eliminate the need for external or other removable tension systems by utilizing air flow as an internal mechanism for regulating the tension applied to screen 30. More particularly, because air pressure within tubes 42*a-d* may tend to pull on screen 30 at substantially equal amounts in all directions, tension applied to screen 30 is internal, and caused by mere inflation of support structure 40. In other words, tension on screen 30 is fully internal and directly regulated by inflation of inflatable screen system 10.

It should be appreciated that the embodiment in FIGS. 1 and 2 is merely one example of an inflatable screen system 10 that has internal tension mechanisms according to aspects of the present invention, and that other embodiments are also contemplated. For example, while skirt 62 is illustrated as being connected to one side of screen 30, this feature is exemplary only. In other embodiments, for instance, tubes 42*a-d* may form a rectangular with an opening substantially the size of screen 30, so that skirt 62 is not necessary. In still other embodiments, skirt 62 may be used and connected to top tube 42*a*, left tube 42*c* and/or right tube 42*d*.

One reason for using skirt 42 may be to increase the height of screen 30. In particular, when bottom tube 42*b* is positioned on the ground, it may be desirable to elevate screen 30 above the ground so that it can be more easily viewed by a number of people. Such is not always the case, however, and in some cases screen 30 may be positioned directly next to bottom tube 42*b* which is on the ground. In other cases, additional supports—whether inflatable or not—may be included. For instance, a structure may be positioned under bottom tube 42*b*, so that it is elevated off the ground and skirt 62 need not be used, and a direct connection between screen 30 and each of tubes 42*a-d* is instead used for placing fully internal tension on screen 30.

Returning now to FIG. 3, another example of an internal tension mechanism 160 is illustrated. In this embodiment, internal tension mechanism 160 also utilizes a skirt 162; however, skirt 162 is positioned fully around screen 130. In such a case, skirt 162 may be directly connected to each of tubes 142*a-d*, as well as to a corresponding side of screen 130. In this manner, as tubes 142*a-d* receive air therein, they can pull on skirt 162, which in turn pulls evenly around screen 130 to the rectangular shape of screen 130, and to place it under fully internal tension.

The foregoing description of example inflatable movie screen structures and systems should be considered exemplary only, and is not intended to limit the scope of the invention, nor require nor necessitate any particular components. For example, as noted above, while only a single blower may be illustrated or used at any time, multiple inlets and/or outlets for air can be provided, and multiple blowers can be used at any time. Additionally, the system may further include a muffler for reducing the amount of sound heard from the blower. An example of such a muffler can be found in U.S. patent application Ser. No. 12/205,493, filed concurrently herewith, and entitled "BLOWER NOISE MUFFLER APPARATUS AND SYSTEM," which is incorporated herein by reference in its entirety.

Manufacturing Materials

As will be appreciated in view of the disclosure herein, any number of materials may be used for the various components of the example embodiments, or for other components according to other aspects of the present invention. For instance, according to one embodiment, support structure 40 or 140 may be made of a PVC or nylon material. In one example, support structures 40, 140 may be made from 210 Denier Nylon Oxford Cloth aid can optionally have a coating, such as with Urethane. One feature of such materials is that they are lightweight as well as durable. Lightweight nylon may also, for example, provide excellent wrinkle resistance, and be used for its ability to minimize wrinkles, even despite storage of the system by compressing it into a duffle bag or box. With such materials, support structures 40, 140 can also have their weight reduced well below standard weights for a similar sized inflatable screen as previously configured. This allows the screen not only to be more easily transported, but to be more easily inflated and maintained in an inflated state.

The screen 30, 120 that forms the projection surface may also be made from the same or a different material as the support structure. Thus, screens 20, 120 may also be made of a PVC or nylon material. In another embodiment, screens 20, 120 may be formed of a polyester material, such as spandex. Such a material may, for example, facilitate stretching when internal tension is applied.

To facilitate stretching of the screens 20, 120 to a desired size when placed under fully internal tension, materials used for screens 20, 120 may also be pre-measured, pre-stretched, and the like. When such materials are, for example, pre-stretched to a predetermined size, and then sewn to the rectangular frame and/or skirt, when the fully internal tension is applied, the screen will stretch exactly the amount desired and to exactly the desired shape. The tension and the shape of the components can thus be predetermined and pre-engineered to provide a specific appearance. For example, as noted above, it may be desired to have the screen 20, 120 and/or skirts 62, 162 have a substantially straight edge where they connect when the system is inflated. To provide such an appearance, skirt 62, 162 may therefore have a curved edge so that when the tension is applied to the system and the screen 20, 120, the tension pulls the curved edge straight.

In general, screens 20, 120 may also be manufactured from a single piece of material, and without seams, except for a seam where screens 20, 120 may be sewn to tubes 42*a-d*, 142*a-d* and/or skirts 62, 162. Screens 20, 120 may therefore be a single piece of fabric that is not inflatable, is light in color (e.g., white, so as to facilitate use as a projection screen), and may be sewn directly into the support structures 40, 140 so that it is not easily removable, is not easily replaceable, and/or is not modular in construction or design. Thus, unlike prior systems which had the specific design of making the screen removable from the support structure, thereby allowing the user to add tension to the screen when necessary, because embodiments of the present invention can provide fully internal tensioning that automatically tensions the screen upon merely inflating the support structure, the screen need not be removable. Furthermore, because the screen can be made of nylon, PVC or other cleanable materials, it can easily be washed in the same manner as the attached support structure.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An inflatable screen, comprising:
   a projection surface;
   an inflatable support; and
   a skirt coupled to said projection surface and said inflatable support, wherein said skirt is disposed between at least a portion of said projection surface and said inflatable support, and wherein said skirt and inflatable support are configured such that as air is supplied to said inflatable support, said inflatable support and said skirt automatically provide fully internal tension to said projection surface.

2. The inflatable screen of claim 1, wherein said inflatable support is configured to provide fully internal tension that is substantially constant around a perimeter of said projection surface.

3. The inflatable screen of claim 1, wherein said projection surface is made of a material having a first predetermined size and shape, and wherein said fully internal tension of said inflatable support is configured to stretch said projection surface to a second predetermined size and shape.

4. The inflatable screen of claim 1, wherein said skirt is disposed around substantially a full perimeter of said projection surface.

5. The inflatable screen of claim 1, wherein one side of said projection surface is attached to said skirt, and wherein all remaining sides of said projection surface are attached directly to inflatable tubes of said inflatable support.

6. The inflatable screen of claim 1, wherein said inflatable support comprises:
at least four inflatable tubes, said at least four inflatable tubes forming a substantially rectangular frame.

7. The inflatable screen of claim 6, wherein said screen is positioned within said substantially rectangular frame, and wherein said screen is configured to have fully internal tension applied at least indirectly by each of said at least four inflatable tubes.

8. The inflatable screen of claim 1, wherein said screen is substantially permanently attached to said inflatable support.

9. The inflatable screen of claim 1, further comprising:
one or more air inlets.

10. An inflatable projection screen structure, comprising:
an inflatable support structure;
a screen substantially permanently coupled to said inflatable support structure; and
an internal tension mechanism coupled to said screen, said internal tension mechanism comprising a skirt disposed between at least a portion of said screen and said inflatable support structure, and said internal tension mechanism being configured to automatically stretch and support said screen within said inflatable support structure when air is supplied to said inflatable support structure, and by using said skirt.

11. An inflatable projection screen structure as recited in claim 10, wherein said inflatable support structure comprises four inflatable tubes forming a substantially rectangular frame in which said screen is housed.

12. An inflatable projection screen structure as recited in claim 10, wherein said screen is directly coupled to said inflatable support structure along at least a first portion of a perimeter of said screen and is directly coupled to said skirt along at least a second portion of said perimeter of said screen.

13. An inflatable projection screen structure as recited in claim 10, wherein said skirt is coupled to said inflatable screen, and to a first substantially horizontal tube and to two vertical tubes of said inflatable support structure.

14. An inflatable projection screen structure as recited in claim 13, wherein said screen is configured to be stretched by said skirt and a second substantially horizontal tube when said inflatable support structure is inflated.

15. An inflatable projection screen structure as recited in claim 10, wherein said screen is further configured to have a substantially constant tension applied around said screen's entire perimeter.

16. An inflatable projection screen structure as recited in claim 10, wherein said inflatable support structure is configured to have air blown therein constantly during use of the inflatable projection screen structure.

17. An inflatable movie screen system, comprising:
an inflatable support structure, said inflatable support structure including an air inlet and at least four inflatable tubes for inflation as air enters said air inlet, said at least four inflatable tubes including:
first and second substantially horizontal tubes; and
two substantially vertical tubes, wherein each of said two substantially vertical tubes is connected to said first substantially horizontal tube and to said second substantially horizontal tube, said four inflatable tubes collectively forming a substantially rectangular support structure;
a projection surface substantially permanently coupled directly to said second substantially horizontal tube, and to each of said two substantially vertical tubes; and
an internal tension mechanism configured to create fully internal tension to stretch said projection surface, wherein said internal tension mechanism creates fully internal tension automatically, by inflation of said four inflatable tubes, and without using external or removable tension mechanisms, and wherein said internal tension mechanism includes a skirt coupled to said first substantially horizontal tube and to each of said two substantially vertical tubes, and permanently coupled to said projection surface.

18. The inflatable movie screen system recited in claim 17, further comprising:
a blower coupled to said air inlet.

19. The inflatable movie screen system recited in claim 18, wherein said blower is selectively removable.

20. The inflatable movie screen system recited in claim 17, wherein said two substantially vertical tubes are configured to receive one or more tethers for maintaining said support structure in an upright position.

\* \* \* \* \*